United States Patent [19]

Sato et al.

[11] 4,384,226
[45] May 17, 1983

[54] SMALL-SIZED ELECTRIC MOTOR

[75] Inventors: Kazuo Sato; Masafumi Sakamoto, both of Kiryu, Japan

[73] Assignee: Nihon Servo Kabushiki Kaisha, Tokyo, Japan

[21] Appl. No.: 281,700

[22] Filed: Jul. 9, 1981

[30] Foreign Application Priority Data

May 26, 1981 [JP] Japan ............................ 56-75188[U]

[51] Int. Cl.³ ............................................. H02K 5/00
[52] U.S. Cl. .................................. 310/89; 310/43; 310/45; 310/90; 310/254; 308/189 R
[58] Field of Search ................... 310/40 MM, 42, 254, 310/43, 256, 89, 90, 45; 308/189 R

[56] References Cited

U.S. PATENT DOCUMENTS

| | | | |
|---|---|---|---|
| 2,819,417 | 1/1958 | Glass | 310/42 |
| 3,873,861 | 3/1975 | Halm | 310/42 |
| 4,048,530 | 9/1977 | Kaufman | 310/90 |
| 4,088,914 | 5/1978 | Aoki | 310/90 |
| 4,093,882 | 6/1978 | Furuta | 310/90 |
| 4,255,681 | 3/1981 | Gerber | 310/40 MM |

Primary Examiner—R. Skudy
Attorney, Agent, or Firm—James E. Nilles

[57] ABSTRACT

A small-sized electric motor comprising an end bracket of a resin enclosing a stator iron core, on which a winding is mounted, and formed in one end face thereof with a bearing housing for receiving one of bearings and in the other end face thereof with a hole, and an independent bearing housing for receiving the other of said bearings, adapted to be received in the hole of said end bracket. The independent bearing housing has its front face portion formed with a plurality of recesses along the outer circumference thereof. The end face of said end bracket is locally melted and poured into the plural recesses formed in said independent bearing housing thereby to fix said independent bearing housing in said end bracket. The independent bearing housing is made of metal.

9 Claims, 8 Drawing Figures

SMALL-SIZED ELECTRIC MOTOR

BACKGROUND OF THE INVENTION

1. Field of the Invention

The present invention relates to a small-sized electric motor, and more particularly to improvements in a small-sized electric motor comprising: the iron core of a stator, on which a winding is mounted; a rotor rotatably born with a small clearance and in a facing manner within the hole which is formed in the center portion of the stator iron core; and a plurality of end brackets which are equipped with bearings and engaging with said stator iron core for rotatably bearing the rotor.

2. Description of the Prior Art

In a small-sized electric motor according to the prior art, an end bracket is constructed of independent parts, and a rotor is concentrically held on the inner circumference of the iron core of a stator by means of bearings which are mounted in that end brackets. It is, therefore, customary to adopt such a construction that the end brackets and the stator iron core are jointed through the faucet joints which can be interposed inbetween to concentrically position the two and that the two end brackets and the stator iron core are fastened by means of through bolts.

This system according to the prior art, in which the faucet joints are concentrically interposed between the stator iron core and the end brackets thereby to joint the same therethrough, provides easily centering and reliable means but has a defect that the production cost is raised partly because the faucet joints require highly precise machining processes and partly because the front and rear end brackets and the stator iron core have to be machined at four portions.

SUMMARY OF THE INVENTION

It is, therefore, an object of the present invention to provide a structure which eliminates the defect following the small-sized electric motor according to the prior art so that a small-sized and highly precise electric motor can be produced at a reduced cost.

Other objects and features of the present invention will be made apparent from the following description taken in conjunction with the accompanying drawings, in which:

DESCRIPTION OF THE PREFERRED EMBODIMENTS

Figure 1:
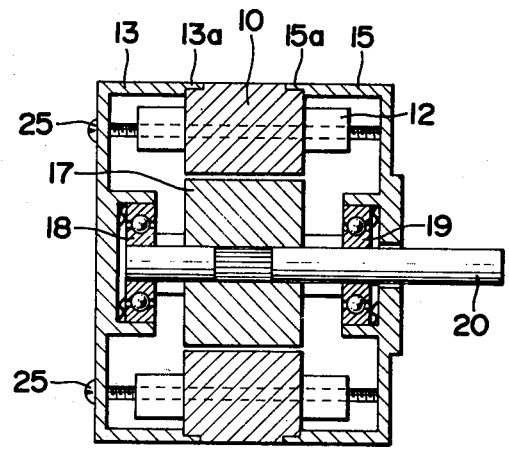
FIG 1 is a partially sectional view showing a small-sized electric motor according to the prior art.
Figure 2:
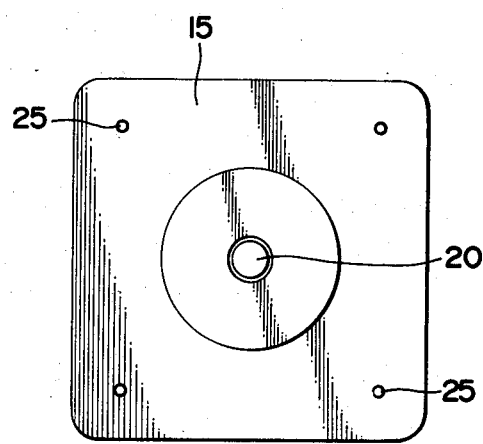
FIG. 2 is a front elevation of the same.

FIGS. 1 and 2 show a small-sized electric motor which has been practised according to the prior art. Reference numerals 10 and 12 indicate the stator iron core and winding of a stator, respectively. Numerals 13 and 15 indicate end brackets which are equipped with rear and front bearings 18 and 19, respectively. Numerals 13a and 15a indicate faucet joints which are used to concentrically joint the respective end brackets and the stator iron core. Numerals 17 and 20 indicate a rotor and its shaft, respectively. Indicated at numeral 25 are through bolts which extend through the one end bracket 13 and the stator iron core 10 into the other end bracket 15 thereby to integrally fasten the front and rear end brackets 13 and 15 and the stator iron core 10.

Figure 3:
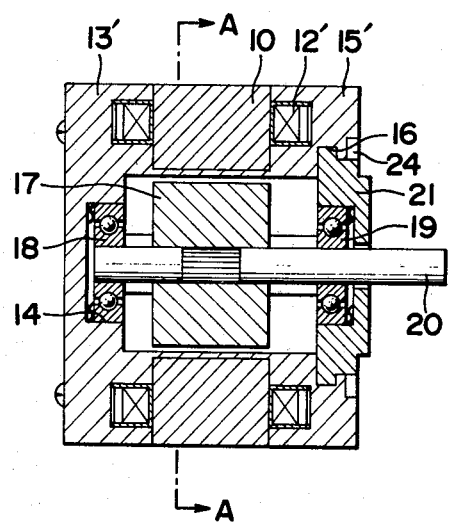
FIG. 3 is a sectional view showing a small-sized electric motor according to the present invention.
Figure 4:
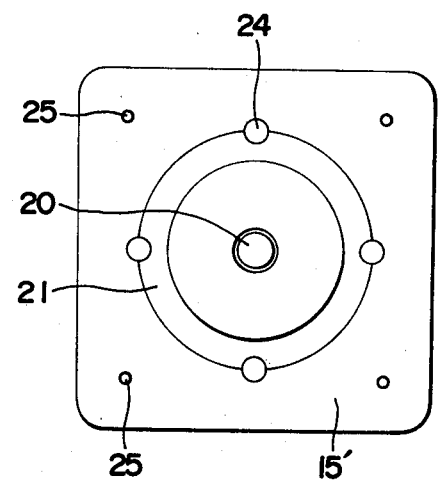
FIG. 4 is a front elevation of the same.

FIG. 3 is a sectional view showing the small-sized electric motor according to one embodiment of the present invention; FIG. 4 is a front elevation of the same; and FIG. 5 is a section taken along line A—A of FIG. 3.

Figure 5:
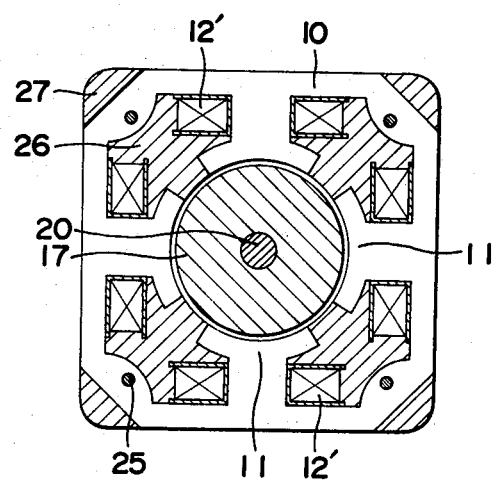
FIG. 5 is a section taken along line A—A of FIG. 3.

In FIGS. 3 to 5, reference numeral 11 indicates a plurality of iron core portions which are embedded radially in the inner circumference of the stator iron core 10 thereby to form a circular inner circumference. Indicated at numeral 12' are stator windings which are mounted on those iron core portions 11. Indicated at numerals 13' and 15' are end brackets which are integrally molded of a resin, which enclose the stator windings 12' and the stator iron core 10, respectively, and which are formed with a rear bearing housing 14 and a hole 16 for receiving a front bearing housing 21, respectively.

Figure 6:
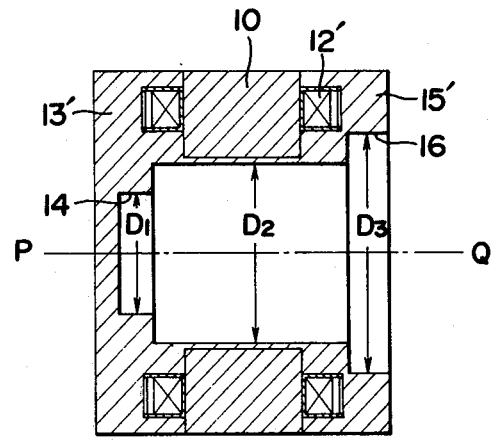
FIG. 6 is an explanatory view showing the assembled condition of the small-sized electric motor according to the present invention.
Figure 7:
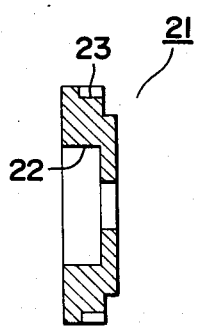
FIG. 7 is a sectional view showing a front bearing housing.
Figure 8:
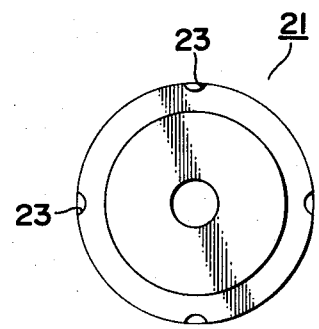
FIG. 8 is a side elevation of the same.

In the present invention, as shown in FIG. 6, holes of the internal diameter $D_1$ of the rear bearing casing 14 and of the internal diameter $D_2$ for receiving the rotor 17, and the hole 16 of the internal diameter $D_3$ for receiving the front bearing housing 21 are formed concentrically with respect to the center line P-Q of the stator. As shown in FIGS. 7 and 8, moreover, the front bearing housing 21 is formed at its rear face center portion with a hole 22 for receiving the front bearing 19 and in the outer circumference of its front face portion with a plurality of recesses 23 having a semi-circular shape, for example.

With the construction thus far described, the small-sized electric motor according to the present invention is assembled by inserting the rotor 17, on which the bearings 18 and 19 are mounted, into the holes of the stator which is molded of a resin, as shown in FIG. 6, by fitting the bearing 18 in the bearing housing 14, and then by fitting the front bearing housing 21 in the hole 16 of the end bracket 15' so that the bearing 19 is received in the hole 22 of the front bearing housing 21. As a result, the rotor 17 is born concentrically with respect to the inner circumference of the stator iron core 10.

Next, the resin at portions 24, which is located on the contacting line between the hole 16 of the end bracket 15' and the front bearing housing 21 and which faces the recesses 23 formed in that front bearing housing 21, is locally melted by the use of ultrasonic waves, high-frequency waves or the like and is poured into the recesses 23, which are formed in the front face of the front bearing housing 21, so that this front bearing housing 21 is fixed to the end bracket 15', thus finishing the assembly.

As has been described hereinbefore, according to the present invention, since the stator iron core 10, the end brackets 13' and 15' and the bearing housings formed in the end brackets 13' and 15', respectively, are molded concentrically and integrally with the inner circumference of the stator iron core 10, as shown in FIGS. 3 and 6, there can be attained such an advantage over the conventional structure that it is possible to dispense with the faucet joints 13a and 15a, which concentrically joint the front and rear end brackets and the stator iron core, and the through bolts 25 for fastening the same.

Incidentally, although the molded type electric motor having the stator iron core and the end brackets integrally molded of a resin is well known in the art, this motor according to the prior art has its stator iron core molded of a resin all over its outer circumference and its front and rear end brackets and stator iron core molded into an integral structure. If the whole circumference is molded of the resin in that way, the radiation is deteriorated to the worse than the stator iron core because a resin is generally worse than metal in thermal conductivity. As a measure for the radiation, it is necessary to use, for example, a special sand resin which has its thermal conductivity improved by mixing an inorganic material such as special sand at a high ratio into the resin. Nevertheless, this means raises another defect that general use is restricted because it is necessary to obtain a special material or to resort to a special molding condition.

According to the present invention, on the contrary, since the surface of the stator iron core is exposed to the outside, i.e., to the ambient air, as shown in FIGS. 3 to 6, the cooling condition of the stator iron core 10 is more excellent than that of the molded motor using the sand resin. Moreover, the front and rear end brackets 13' and 15' are connected internally by molded resin in spaces 26 between the stator windings 12' and externally by molded resin at the corners 27 of the stator iron core 10 so that they can be fixedly connected integrally with the stator iron core. Still moreover, since the partial fusion is used for fixing the independent front bearing housing 21, there can be attained effects that the working time period is shortened and that the fastened structure is reliable.

On the other hand, if the independent front bearing housing 21 is made of metal, there can be attained another effect that the front bearing housing 21 can be used as one electrode in case the partial resin is melted by the high-frequency waves when the front bearing housing is to be fixed.

What is claimed is:

1. An electric motor comprising:
   a rotor including a shaft;
   a stator comprising a body of solidified moldable electrical insulating material in which stator windings and an iron core are embedded and including a bore closed at one end by said material and open at the other end in which said rotor is received;
   a bearing housing mounted in the open end of said bore and having a rotor shaft hole therethrough;
   bearing means at the closed end of said bore and on said bearing housing on which said rotor is rotatably mounted; and
   means for rigidly securing said bearing housing in said bore and comprising a sealing space between said bearing housing and said body accessible from the exterior of said body and solidified insulating material of the stator body in said sealing space to fix said bearing housing to said body.

2. An electric motor according to claim 1 wherein said bore comprises a first portion nearest its closed end for receiving bearing means, a second portion concentric with and of larger diameter than said first portions for accommodating said rotor, and a third portion concentric with and of larger diameter than said second portion for accommodating said bearing housing.

3. An electric motor according to claims 1 or 2 wherein said sealing space is defined by at least one recess formed in the peripheral edge of said bearing housing.

4. An electric motor according to claims 1 or 2 wherein said iron core is embedded in said insulating material in such a manner that portions of said iron core form part of the exterior surface of said stator.

5. An electric motor comprising:
   a rotor including a shaft;
   a stator comprising a body of solidified moldable electrical insulating material in which stator windings and an iron core are embedded and including a bore closed at one end by said material and open at the other end, said iron core being embedded in said insulating material in such a manner that portions of said iron core form part of the exterior surface of said stator, said bore comprising a first portion nearest its closed end for receiving bearing means, a second portion concentric with and of larger diameter than said first portion for accommodating said rotor and a third portion concentric with and of larger diameter than said second portion for accommodating said bearing housing;
   a bearing housing mounted in the open end of said bore and having a rotor shaft hole therethrough;
   bearing means at the closed end of said bore and on said bearing housing on which said rotor is rotatably mounted; and
   means for rigidly securing said bearing housing in said bore and comprising a sealing space between said bearing housing and said body accessible from the exterior of said body and solidified insulating material in said sealing space to fix said bearing housing to said body, said sealing space being defined by at least one recess formed in the peripheral edge of said bearing housing.

6. An electric motor according to claim 5 wherein said shaft extends from opposite ends of said rotor;
   wherein said bearing means includes a first bearing journalled to one end of said shaft and located within said first portion of said bore;
   wherein said bearing housing is provided with a recess; and
   wherein said bearing means further includes a second bearing journalled to the other end of said shaft and located within said recess in said bearing housing.

7. An electric motor according to claims 5 or 6 wherein said peripheral edge of said bearing housing is provided with a plurality of recesses located at spaced apart intervals therearound.

8. An electric motor according to claims 5 or 6 wherein said solidified material comprises molded insulating material comprising said body of said stator.

9. An electric motor according to claim 7 wherein said solidified material comprises molded insulating material comprising said body of said stator.

* * * * *